United States Patent
Bhatt et al.

(10) Patent No.: US 11,880,981 B2
(45) Date of Patent: Jan. 23, 2024

(54) METHOD AND SYSTEM FOR LEAF AGE ESTIMATION BASED ON MORPHOLOGICAL FEATURES EXTRACTED FROM SEGMENTED LEAVES

(71) Applicant: Tata Consultancy Services Limited, Mumbai (IN)

(72) Inventors: Prakruti Vinodchandra Bhatt, Thane West (IN); Sanat Sarangi, Thane West (IN); Srinivasu Pappula, Hyderabad (IN); Avil Saunshi, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 392 days.

(21) Appl. No.: 17/446,725

(22) Filed: Sep. 2, 2021

(65) Prior Publication Data

US 2022/0130051 A1    Apr. 28, 2022

(30) Foreign Application Priority Data

Oct. 23, 2020   (IN) .............................. 202021046224

(51) Int. Cl.
*G06T 7/13*    (2017.01)
*G06T 7/187*   (2017.01)
(Continued)

(52) U.S. Cl.
CPC .......... *G06T 7/13* (2017.01); *G06F 18/24147* (2023.01); *G06T 5/002* (2013.01);
(Continued)

(58) Field of Classification Search
CPC ........... G06T 7/13; G06T 5/002; G06T 5/009; G06T 7/187; G06T 2207/30188; G06F 18/24147; G06V 10/267; G06V 10/56
See application file for complete search history.

(56) References Cited

U.S. PATENT DOCUMENTS

2019/0147249 A1*  5/2019  Kiepe ................... G06V 20/20
382/110

FOREIGN PATENT DOCUMENTS

CN    106683098 A  *  5/2017
CN    106778845 A     5/2017

OTHER PUBLICATIONS

Nantheera Anantrasirichai et al., "Automatic Leaf Extraction from Outdoor Images", Computer Science, Sep. 2017, Arxiv, https://arxiv.org/ftp/arxiv/papers/1709/1709.06437.pdf.
(Continued)

*Primary Examiner* — Amandeep Saini
*Assistant Examiner* — Giang Thi Han Nguyen
(74) *Attorney, Agent, or Firm* — FINNEGAN, HENDERSON, FARABOW, GARRETT & DUNNER LLP

(57) ABSTRACT

This disclosure relates generally to estimating age of a leaf using morphological features extracted from segmented leaves. Traditionally, leaf age estimation requires a single leaf to be plucked from the plant and its image to be captured in a controlled environment. The method and system of the present disclosure obviates these needs and enables obtaining one or more full leaves from images captured in an uncontrolled environment. The method comprises segmenting the image to identify veins of the leaves that further enable obtaining the full leaves. The obtained leaves further enable identifying an associated plant species. The method also discloses some morphological features which are fed to a pre-trained multivariable linear regression model to estimate age of every leaf. The estimated leaf age finds application in estimation of multiple plant characteristics like photosynthetic rate, transpiration, nitrogen content and health of the plants.

18 Claims, 17 Drawing Sheets

(51) Int. Cl.
*G06V 10/56* (2022.01)
*G06V 10/26* (2022.01)
*G06T 5/00* (2006.01)
*G06F 18/2413* (2023.01)

(52) U.S. Cl.
CPC .............. *G06T 5/009* (2013.01); *G06T 7/187* (2017.01); *G06V 10/267* (2022.01); *G06V 10/56* (2022.01); *G06T 2207/30188* (2013.01)

(56) References Cited

OTHER PUBLICATIONS

Kenta Itakura et al., "Automatic Leaf Segmentation for Estimating Leaf Area and Leaf Inclination Angle in 3D Plant Images", Sensors, Oct. 2018, vol. 18 (10), MDPI, https://www.mdpi.com/1424-8220/18/10/3576.

Liankuan Zhang et al, "A leaf vein detection scheme for locating individual plant leaves", International Conference on Information and Communication Technology Robotics, Sep. 2018, IEEE, http://his.pusan.ac.kr/bbs/robotics/10613/701103/artclView.do.

* cited by examiner

METHOD AND SYSTEM FOR LEAF AGE ESTIMATION BASED ON MORPHOLOGICAL FEATURES EXTRACTED FROM SEGMENTED LEAVES

PRIORITY CLAIM

This U.S. patent application claims priority under 35 U.S.C. § 119 to: Indian Patent Application No. 202021046224, filed on Oct. 23, 2020. The entire contents of the aforementioned application are incorporated herein by reference.

TECHNICAL FIELD

The disclosure herein generally relates to image processing for precision farming, and, more particularly, to systems and computer implemented method for leaf age estimation based on morphological features extracted from segmented leaves.

BACKGROUND

Age of leaf is a critical information in estimation of multiple plant characteristics like photosynthetic rate, transpiration, nitrogen content and health of plants. Traditional methods to estimate leaf age, require a single leaf to be plucked from the plant and its image to be captured in a clear background. These methods assume it to be a single leaf in the image. Certain methods use reference objects to calculate the dimensions of the leaf and require the camera to be placed at a fixed distance. It may not always be conducive to capture leaf images in a controlled environment.

SUMMARY

Embodiments of the present disclosure present technological improvements as solutions to one or more of the above-mentioned technical problems recognized by the inventors in conventional systems.

In an aspect, there is provided a processor implemented method comprising the steps of: receiving, via one or more hardware processors, an image including one or more leaves that need to be monitored; segmenting, via the one or more hardware processors, the received image to identify veins in the one or more leaves, wherein identifying veins comprises: performing edge detection on the received image to obtain edges representative of veins and contours of the one or more leaves; determining straight lines from the obtained edges; and identifying the determined straight lines as veins if a difference between average pixel intensity on either side of the straight lines is lesser than an empirically determined first threshold; obtaining, via the one or more hardware processors, a de-veined image by replacing each pixel on the identified veins with an average pixel intensity of neighboring pixels; selecting, via the one or more hardware processors, a seed point for each of the one or more leaves using distance transform on a binary image of the de-veined image; and performing region growing, via the one or more hardware processors, using an k-neighborhood method, to obtain contours of one or more full leaves, wherein the region growing starts from the seed point selected for each of the one or more leaves.

In another aspect, there is provided a system comprising: one or more data storage devices operatively coupled to one or more hardware processors via the one or more input/output interfaces and configured to store instructions configured for execution via the one or more hardware processors to: receive an image including one or more leaves that need to be monitored; segment, the received image to identify veins in the one or more leaves, wherein identifying veins comprises: performing edge detection on the received image to obtain edges representative of veins and contours of the one or more leaves; determining straight lines from the obtained edges; and identifying the determined straight lines as veins if a difference between average pixel intensity on either side of the straight lines is lesser than an empirically determined first threshold; obtain a de-veined image by replacing each pixel on the identified veins with an average pixel intensity of neighboring pixels; select a seed point for each of the one or more leaves using distance transform on a binary image of the de-veined image; and perform region growing using a k-neighborhood method, to obtain contours of one or more full leaves, wherein the region growing starts from the seed point selected for each of the one or more leaves.

In yet another aspect, there is provided one or more non-transitory machine readable information storage media comprising one or more instructions which when executed by one or more hardware processors causes the one or more hardware processor to perform a method comprising: receiving, via one or more hardware processors, an image including one or more leaves that need to be monitored; segmenting, via the one or more hardware processors, the received image to identify veins in the one or more leaves, wherein identifying veins comprises: performing edge detection on the received image to obtain edges representative of veins and contours of the one or more leaves; determining straight lines from the obtained edges; and identifying the determined straight lines as veins if a difference between average pixel intensity on either side of the straight lines is lesser than an empirically determined first threshold; obtaining, via the one or more hardware processors, a de-veined image by replacing each pixel on the identified veins with an average pixel intensity of neighboring pixels; selecting, via the one or more hardware processors, a seed point for each of the one or more leaves using distance transform on a binary image of the de-veined image; and performing region growing, via the one or more hardware processors, using an k-neighborhood method, to obtain contours of one or more full leaves, wherein the region growing starts from the seed point selected for each of the one or more leaves.

In accordance with an embodiment of the present disclosure, the one or more hardware processors are further configured to pre-process the received image by performing one or more of brightness correction, light reflection removal and background removal.

In accordance with an embodiment of the present disclosure, the one or more hardware processors are configured to perform light reflection removal by: identifying pixels with luminance value greater than 80, from a Hue-Saturation-Luminance (HSL) format of the received image as overexposed pixels; selecting an m×m window, for each of the identified overexposed pixels, with each of the identified overexposed pixel being the centroid of an associated window; and replacing each of the identified overexposed pixels with neighboring pixels having a minimum hue difference with the identified overexposed pixels.

In accordance with an embodiment of the present disclosure, the one or more hardware processors are configured to perform selecting a seed point for each of the one or more leaves by: converting the deveined image to the binary image such that a white region therein forms a foreground which is representative of the one or more leaves while the other areas in the image being black form a background of the image; applying a distance transform on the binary image to replace value of each pixel in the binary image by an associated distance to a nearest background pixel; identifying one or more regions within the distance transformed image as one or more skeletons, using thinning, wherein the one or more skeletons are characterized by pixels having a maximum value corresponding to a farthest region from a boundary of the white region; separating the one or more skeletons of overlapping leaves from the one or more leaves into sub-skeletons by eliminating pixels having values lower than an empirically determined second threshold, wherein each of the sub-skeletons is representative of one of the one or more leaves; and selecting a pixel having a maximum value in each of the sub-skeletons as the seed point for an associated sub-skeleton corresponding to one of the one or more leaves.

In accordance with an embodiment of the present disclosure, the one or more hardware processors are further configured to apply erosion and dilation on the binary image to remove noise pixels prior to applying the distance transform.

In accordance with an embodiment of the present disclosure, the one or more hardware processors are configured to perform region growing by: computing gradient value of pixels of the deveined image in X and Y directions using an edge detection filter; computing a sum of squares of the computed gradient value of pixels of the binary image of the deveined image; computing square root of the sum of squares to obtain a gradient image; computing a gradient threshold using the computed gradient image by: selecting a window of size n×n around the seed point; computing an N-bin histogram of the gradient value of pixels in the gradient image; and calculating the gradient threshold as ((bin_number+1)*10)/255, wherein bin_number represents a bin with a highest pixel count; and initiating region growing by starting from the seed point and iteratively merging pixels having the computed gradient value greater than the computed gradient threshold to obtain one or more full leaves corresponding to each of the one or more seed points, wherein the iterative merging of the pixels stop when the computed gradient threshold is less than the value of pixels in the gradient image.

In accordance with an embodiment of the present disclosure, the one or more hardware processors are further configured to perform one or more of: identifying an associated plant species based on the obtained one or more full leaves and similarity of leaf shapes using shape matching method-based Hu moments; computing morphological features of the obtained one or more full leaves including i) ratio of leaf length to width of leaf calculated at the center of the leaf (ii) ratio of leaf length to the maximum width of the leaf (iii) ratio of bounding box area around a leaf to the area of the leaf (iv) color of a leaf in terms of 'a' and 'b' components on CieLab format; receiving an additional morphological feature in the form of growth stage of the plant associated with the one or more leaves being monitored; and estimating an age of every leaf from the identified one or more full leaves using a pre-trained multivariable linear regression model receiving one or more of the computed and received morphological features, wherein the multivariable linear regression model is pre-trained using the identified plant species, associated leaf shapes, morphological features of leaves of the identified plant species and age thereof.

In accordance with an embodiment of the present disclosure, the one or more hardware processors are further configured to perform, prior to computing the morphological features, the steps of: converting an image associated with each of the identified one or more full leaves to gray scale to obtain a binary image; shifting the centroid of each of the one or more full leaves to the center of the binary image, wherein the centroid is computed using co-ordinates of points along the contour of each of the one or more full leaves; and rotating each of the one or more full leaves such that a line joining the center of the image with a farthest point on the contour of the one or more full leaves passes through the center of the image along the vertical axis by: determining the farthest point on the contour of the one or more full leaves that is at a maximum distance from the associated centroid; computing an angle between (i) a line joining the center of the image to the determined farthest point and (ii) a line passing through the center of the image along the vertical axis; and rotating each of the one or more full leaves based on a rotation matrix defined using the computed angle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 10A illustrates a leaf with a centroid marked therein while

DETAILED DESCRIPTION

Figure 1:
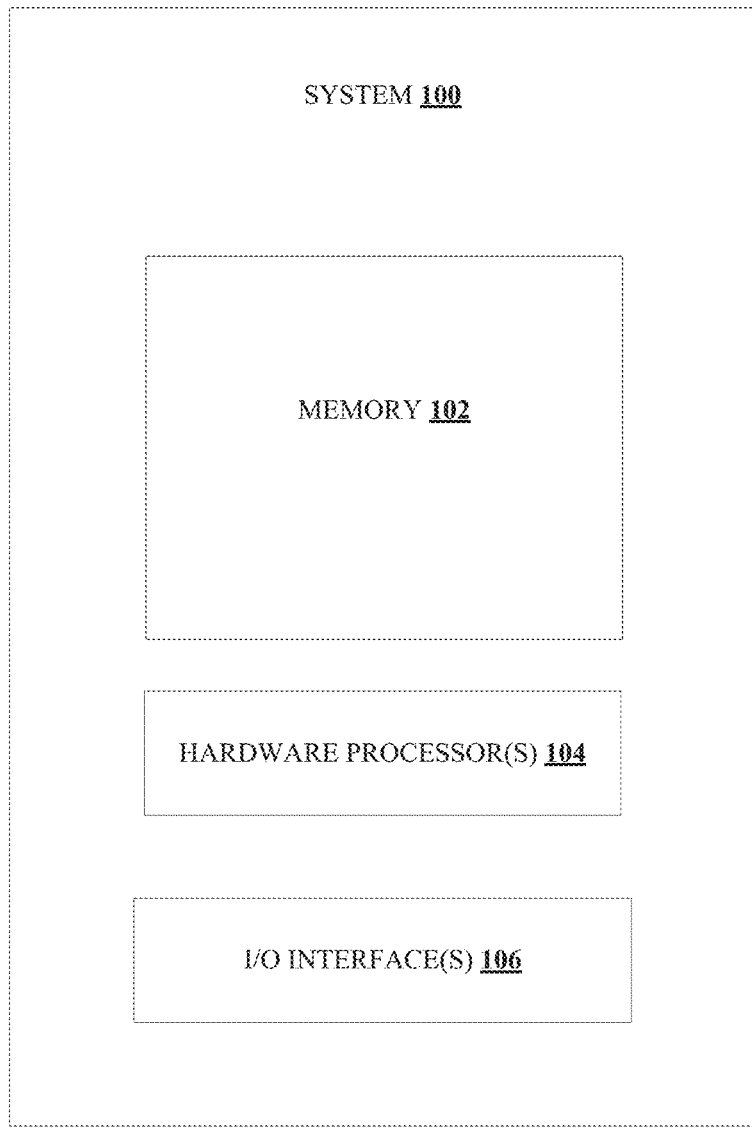
FIG. 1 illustrates an exemplary block diagram of a system for leaf age estimation based on morphological features extracted from segmented leaves, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

State of the art techniques for estimating leaf age require leaf image to be captured in a controlled environment and also assume that a single leaf is captured in the image. Some methods use reference objects (like a coin as a reference entity) to calculate dimensions of the leaf and require the camera to be placed at a fixed distance. Method and system of the present invention facilitate leaf age estimation without any reference or fixed distance placement of the camera and also does not necessitate a controlled background. Furthermore, the leaves may overlap each other. Segmentation of leaves from an image captured in an uncontrolled condition to identify veins in the leaves and further full leaves which then aid estimation of their age is the technical problem addressed by the method and system of the present disclosure. Also, the segmentation of a full leaf done traditionally utilizes supervised neural network based methods which require heavy image annotation, whereas the present disclosure facilitates segmentation of leaves captured in an uncontrolled environment using unsupervised image processing.

In the context of the present disclosure, leaf age (or age of leaf is in terms of number of days since its onset. Depending on the type of crop, for instance, for seasonal crops, onset may be considered from the time seeds are sown. Alternatively for plantation crops, onset may be considered from the first day of appearance of the leaves.

Age of leaf is a critical information in estimation of multiple characteristics like photosynthetic rate, transpiration, nitrogen content and health of the plants. For example, in some crops, nutrient deficiency may visually appear like a disease infestation. For instance, Manganese deficiency in grapes on leaf at a younger age may look like downy mildew infection since the feature appears to be same on a leaf. Age of a leaf separates nutrient deficiency from disease infection. Nutrient deficiency has different patterns associated with different ages as well. There may be a confusion in the nutrient itself that is deficient in a young leaf. For instance, Manganese deficiency may look like Magnesium deficiency on a young leaf. Thus the method and system of the present disclosure can find application in identification of leaf disease, nutrient deficiency, water scarcity, heavy utilization of fertilizers, and the like.

Referring now to the drawings, and more particularly to FIG. 1 through FIG. 11B, where similar reference characters denote corresponding features consistently throughout the figures, there are shown preferred embodiments and these embodiments are described in the context of the following exemplary system and/or method.

FIG. 1 illustrates an exemplary block diagram of a system 100 for leaf age estimation based on morphological features extracted from segmented leaves, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
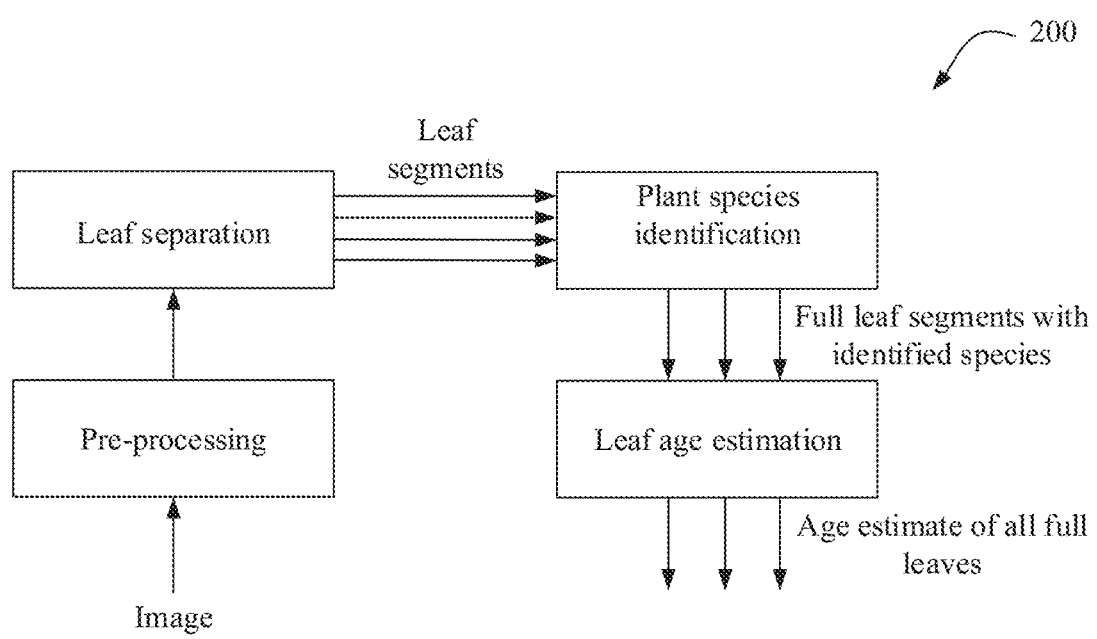
FIG. 2 illustrates a high level flow chart of a method for leaf age estimation based on morphological features extracted from segmented leaves, according to some embodiments of the present disclosure.
Figure 3A:
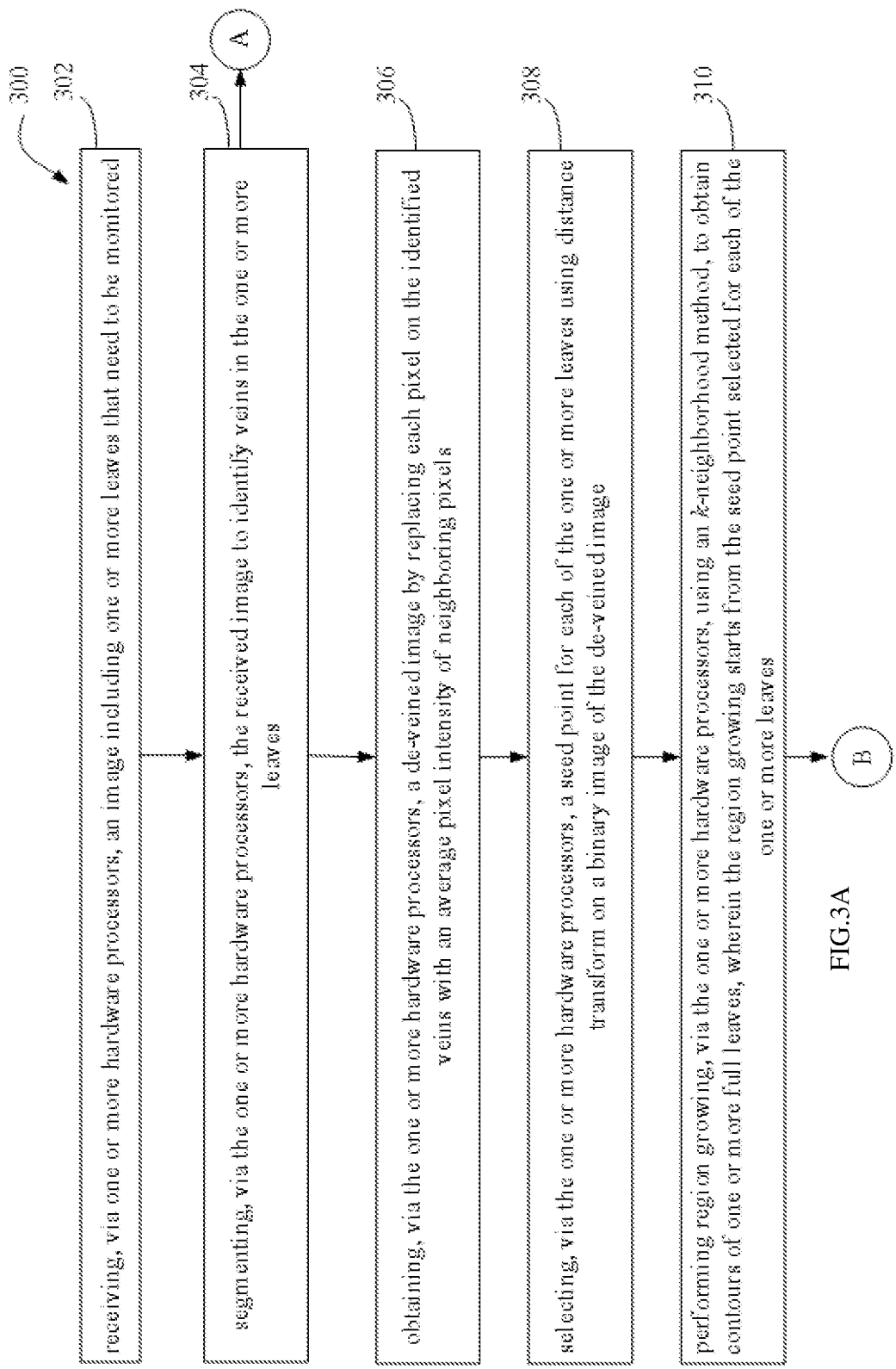
FIG. 3A, 3B, FIG. 3C illustrate an exemplary flow diagram of a computer implemented method for leaf age estimation based on morphological features extracted from segmented leaves, in accordance with some embodiments of the present disclosure.
Figure 3B:
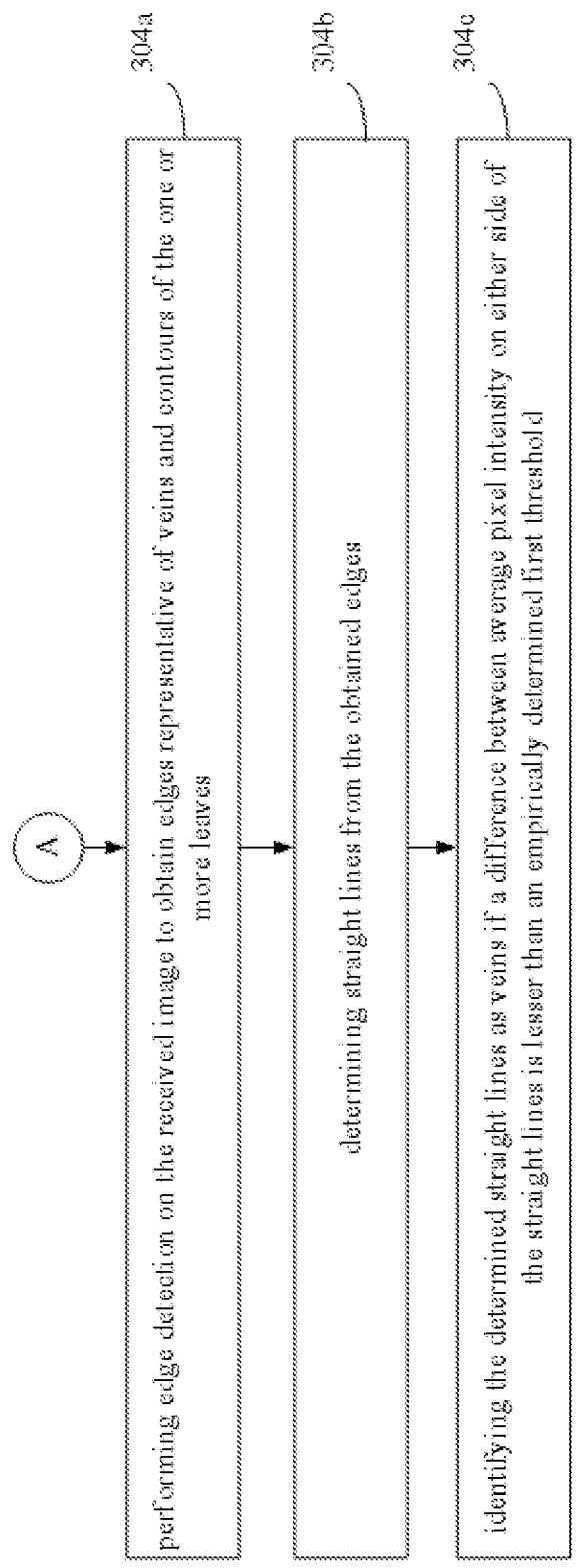
Figure 3C:
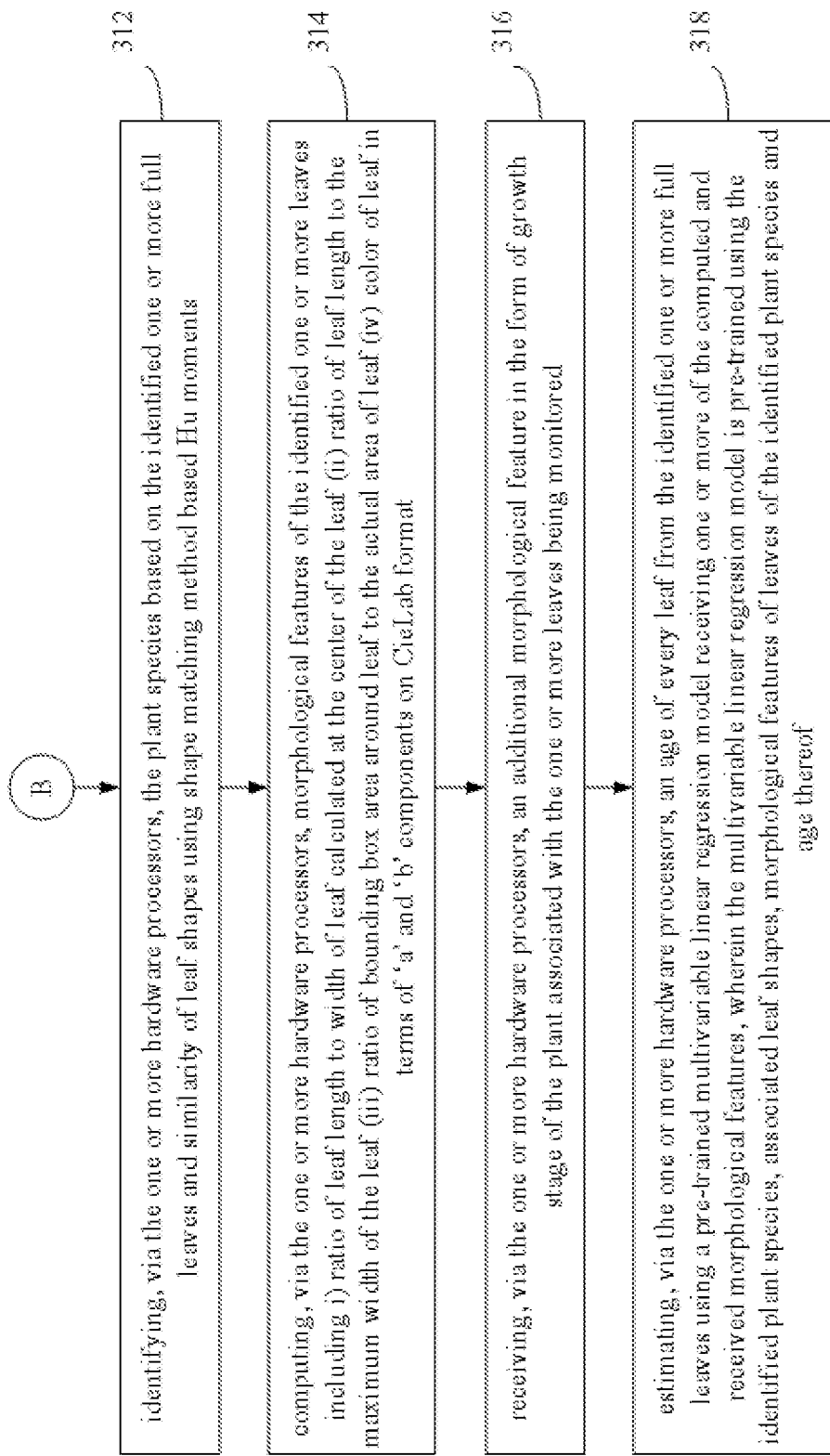

FIG. 2 illustrates a high level flow chart of a method for leaf age estimation based on morphological features extracted from segmented leaves, in accordance with an embodiment of the present disclosure while FIG. 3A through FIG. 3C illustrates an exemplary flow diagram of a computer implemented method 300 for leaf age estimation based on morphological features extracted from segmented leaves, in accordance with an embodiment of the present disclosure. In an embodiment, the system 100 includes one or more data storage devices or memory 102 operatively coupled to the one or more processors 104 and is configured to store instructions configured for execution of steps of the method 300 by the one or more processors 104. The steps of the method 300 will now be explained in detail with reference to the components of the system 100 of FIG. 1 and the high level flow chart of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more processors 104 are configured to receive, at step 302, an image including one or more leaves that need to be monitored. The image may be captured by any means including a hand-held device or a mobile phone in an uncontrolled environment.

As shown in the high level flow chart of FIG. 2, the received image may be pre-processed for correction of conditions like over-exposure, reflection, brightness in the image. The pre-processed or corrected image undergoes leaf separation which involves obtaining leaf segments or contours of one or more full leaves. The obtained one or more full leaf contours are used to identify associated plant species. Each leaf contour shape is matched with shapes of known plants saved in a plant database and using Hu-moments the plant species is identified. In an embodiment, the plant database is comprised in the one or more data storage devices or memory 102. Different plants have different dimensions at different growth stages, but those belonging to the same species have similar properties. Each complete or full leaf segment or contour along with the identified plant specifies facilitates age estimation based on one or more morphological features using a pre-trained multivariable linear regression model.

Details of the method 300 in accordance with an embodiment of the present disclosure will be described hereafter with reference to FIG. 3A through FIG. 3C. In an embodiment, the one or more processors 104 are configured to segment, at step 304, the received image to identify veins in the one or more leaves. In an embodiment, the step of segmenting may be preceded by pre-processing the received image by performing one or more of brightness correction, light reflection removal and background removal. If these are not corrected, additional edges or regions may be added inside the leaves in the images leading to misguided leaf contours. In an embodiment, brightness correction may be achieved by contrast stretching, histogram equalization, and the like. Likewise, background removal may be achieved by color based thresholding, wherein a zero value is assigned to pixels having values not within a hue range of the color (green, yellow, etc.) associated with the one or more leaves being monitored. Basically, colors not relevant to the color of the leaves being monitored are removed.

Figure 4A:
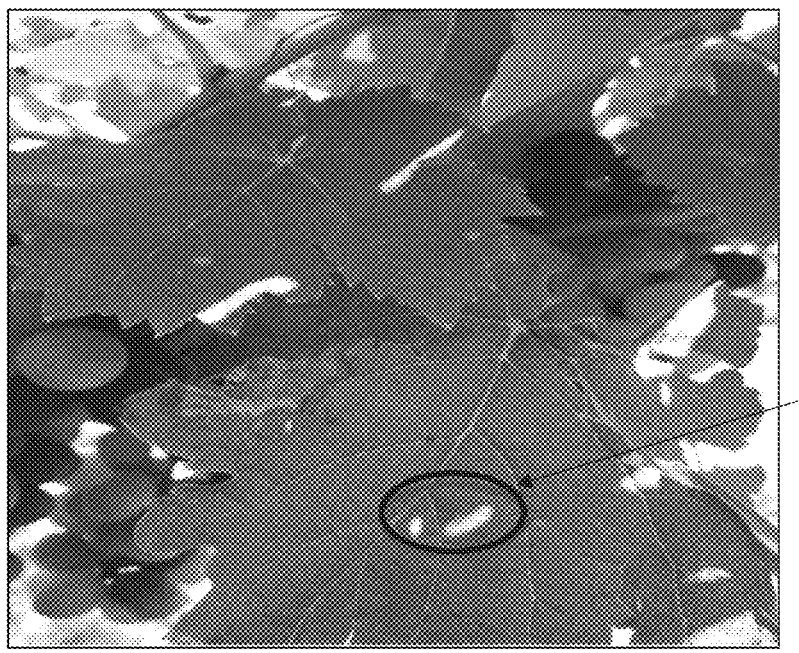
FIG. 4A illustrates an image of a leaf with sunlight reflection and FIG. 4B illustrates a reconstructed image of the leaf of FIG. 4A with the over exposure removed, according to some embodiments of the present disclosure.
Figure 4B:
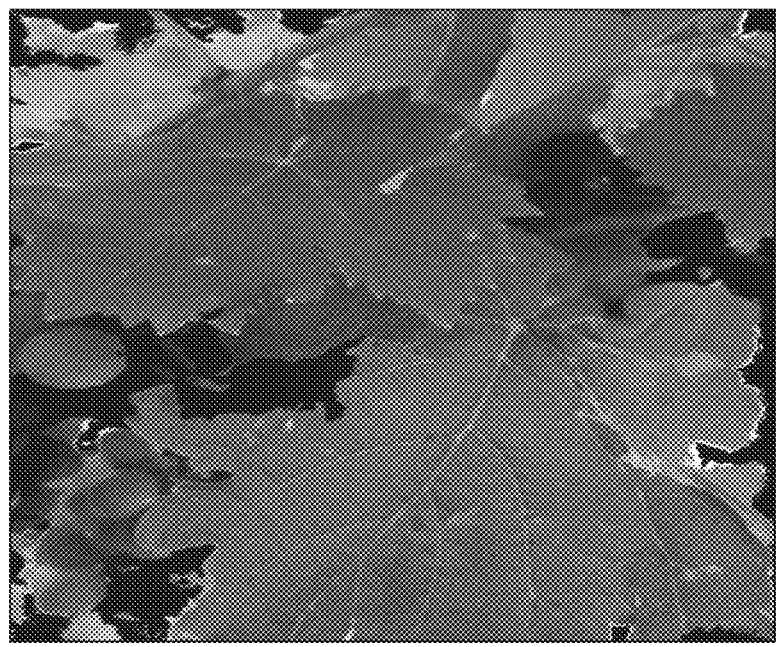

FIG. 4A illustrates an image of a leaf with sunlight reflection referenced by numeral 402. In an embodiment, the step of light reflection removal comprises identifying pixels with luminance value greater than 80, from a Hue-Saturation-Luminance (HSL) format of the received image as overexposed pixels. An m×m window is selected, for each of the identified overexposed pixels, with each of the identified overexposed pixel being a centroid of an associated window. Each of the identified overexposed pixels are replaced with neighboring pixels having a minimum hue difference with the identified overexposed pixels. This reconstruction of over-exposed areas starts from the boundary of the m×m window and gradually proceeds toward the centroid of the window. By removing overexposure due to light reflection, all pixels with values not within the Hue range of the color associated with the one or more leaves being monitored, say green (having Hue value 81 to 360 degrees) are made 0, thereby removing non-leaf data from the received image. FIG. 4B illustrates a reconstructed image of the leaf of FIG. 4A with the over exposure removed, according to some embodiments of the present disclosure.

Figure 5A:
FIG. 5A illustrates an image of leaves with straight lines determined using Hough transform and FIG. 5B illustrates veins identified from the straight lines of FIG. 5A, in accordance with some embodiments of the present disclosure.

In an embodiment, the step of segmenting the received image to identify veins in the one or more leaves comprises performing, at step 304a, edge detection on the received image to obtain edges, representative of veins and contours of the one or more leaves. In an embodiment, the edge detection may be performed using Canny edge detection. From the obtained edges, at step 304b, straight lines are determined. In an embodiment, Hough transform may be used to determine the straight lines. FIG. 5A illustrates an image of leaves with straight lines determined using Hough transform and referenced by numerals 502, 504 and 506. Veins create a more linear structure with higher lengths than leaf edges. Adjusting parameters in Hough transform helps differentiate between veins and leaf edges.

In an embodiment, the hyperparameters in Hough transform which helps differentiate between veins and leaf edges are:

ρ resolution 1
θ resolution 0.5 degree
Maximum number of peaks to be detected 30.
Peaks with accumulator count higher than 30% of max count are considered.
Minimum line length 30
Two edges are considered as single edge if gap between edges ≤4.

Figure 5B:
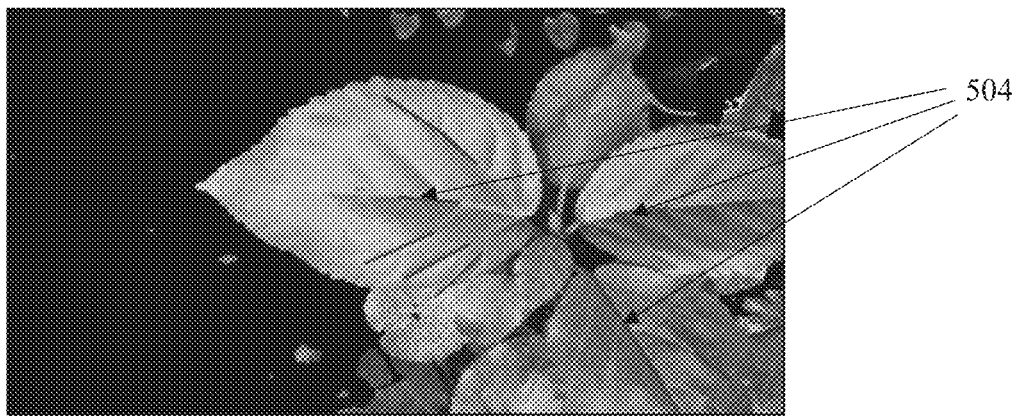

Both sides of a vein tend to have almost similar hue as it is part of the same leaf. Thus, the determined straight lines are identified as veins, at step 304c, if a difference between average pixel intensity on either side of the straight lines is lesser than an empirically determined first threshold. For instance, for grape leaves, the empirically determined first threshold is 20. FIG. 5B illustrates veins (reference numeral 504) identified from the straight lines of FIG. 5A, in accordance with some embodiments of the present disclosure.

Figure 6A:
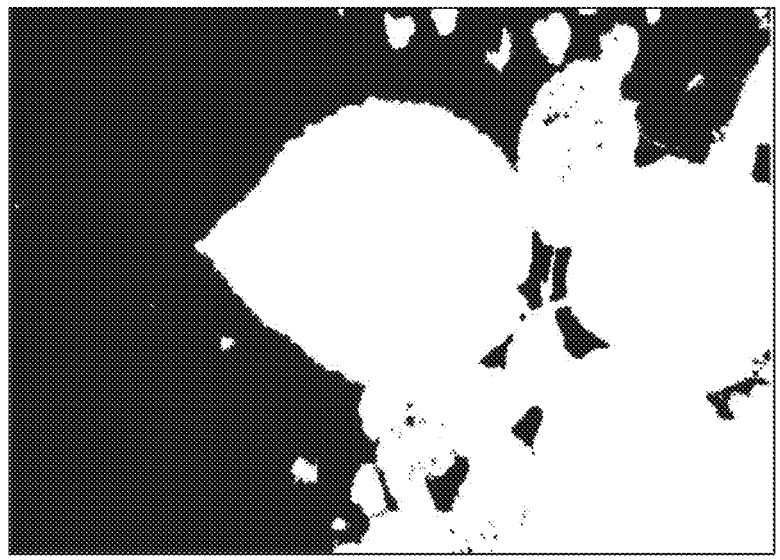
FIG. 6A illustrates a binary image of a deveined image of leaves and FIG. 6B illustrates a distance transformed image using the deveined image of FIG. 6A, in accordance with some embodiments of the present disclosure.

In an embodiment, the one or more processors 104 are configured to obtain, at step 306, a de-veined image by replacing each pixel on the identified veins with an average pixel intensity of neighboring pixels. This step smoothens the inner pixels of the one or more leaves in the image. FIG. 6A illustrates a binary image of a deveined image of leaves.

Figure 6B:
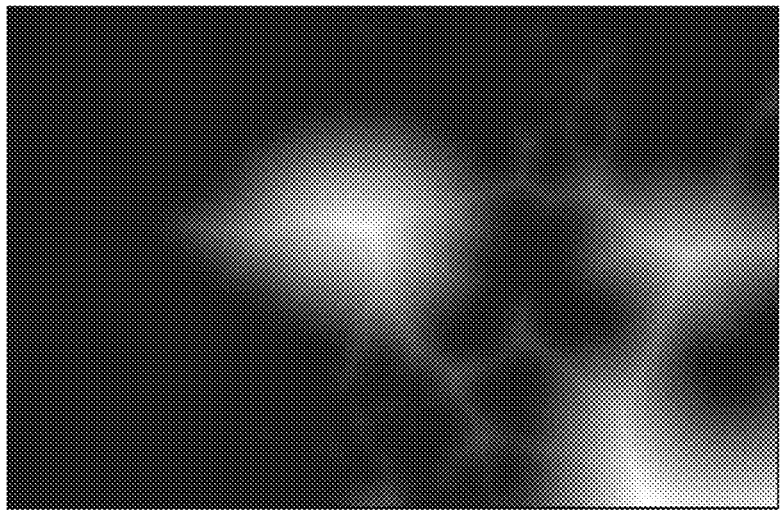

In an embodiment, the one or more processors 104 are configured to select, at step 308, a seed point for each of the one or more leaves using distance transform on a binary image of the de-veined image. The step of selecting a seed point for each of the one or more leaves comprises converting the deveined image to the binary image such that a white region therein forms a foreground which is representative of the one or more leaves while the other areas in the image being black form a background of the image. Applying distance transform on the binary image gives an output where value of each pixel in the binary image is replaced by an associated distance to a nearest background pixel (zero). FIG. 6B illustrates a distance transformed image using the deveined image of FIG. 6A, in accordance with some embodiments of the present disclosure. The pixels of leaves have the distance values distributed such that the pixels in a central area of each leaf has a maximum distance value, while the edge pixels of the leaves have least distance value. So, the distance of all zero pixels is zero. In an embodiment, the step of applying a distance transform may be preceded by applying erosion and dilation on the binary image to remove noise pixels.

Figure 7A:
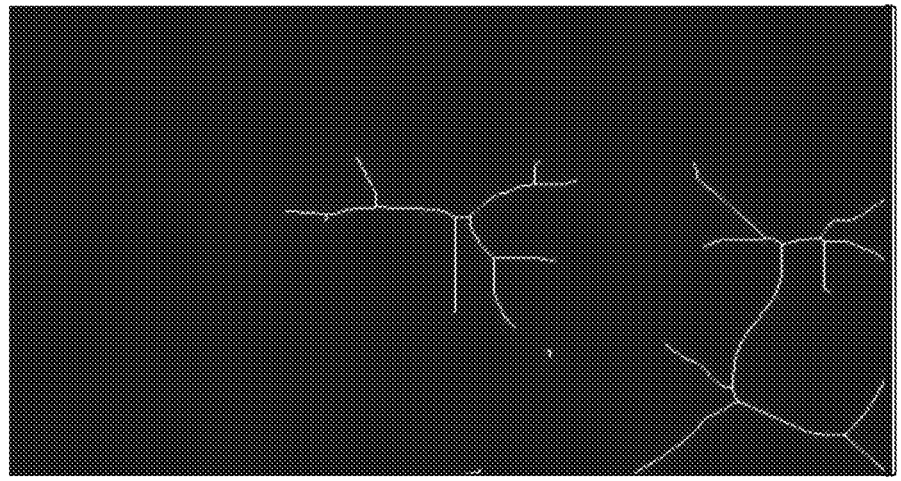
FIG. 7A illustrates skeletons identified within the distance transformed image of FIG. 6B

One or more regions within the distance transformed image are then identified as one or more skeletons, using thinning. The one or more skeletons are characterized by pixels having a maximum value corresponding to a farthest region from a boundary of the white region. In the context of the present disclosure, each of the one or more skeletons is a medial axis representation of a shape or binary image. FIG. 7A illustrates skeletons identified within the distance transformed image of FIG. 6B. In an embodiment, the thinning method applied to identify skeletons representing leaves may be a set of some morphological operations like erosion, dilation, subtraction or a Zhang-Seun thinning algorithm.

Figure 7B:
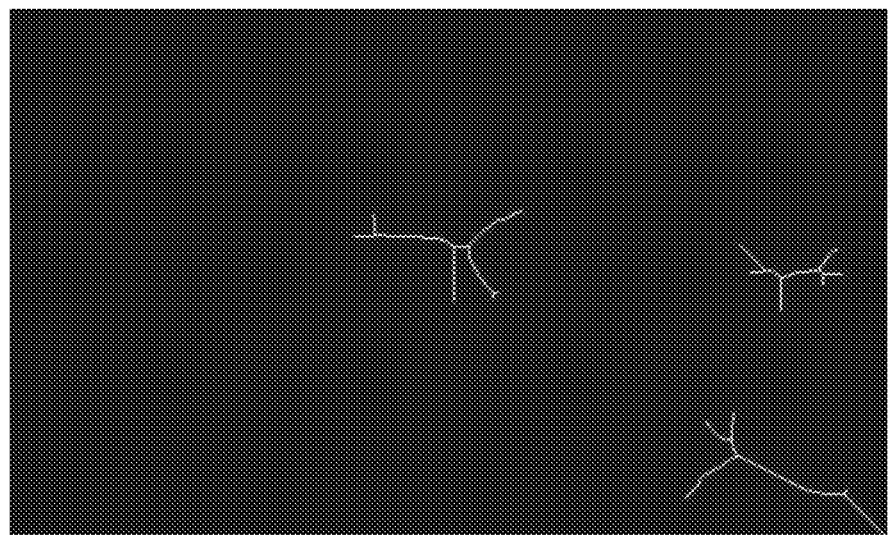
FIG. 7B illustrates sub-skeletons obtained from the FIG. 7A, in accordance with some embodiments of the present disclosure.
Figure 8:
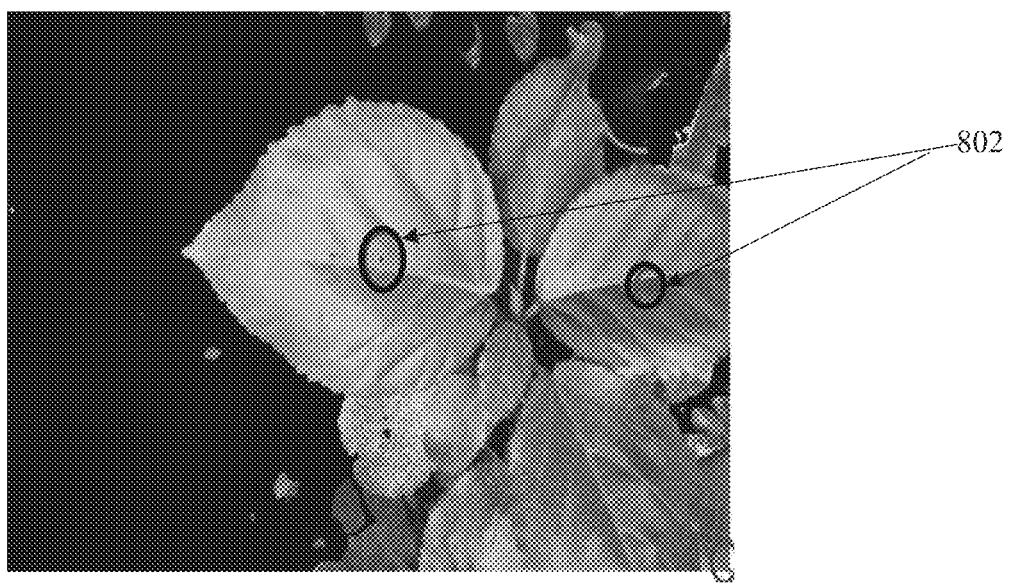
FIG. 8 illustrates seed points selected for each leaf, in accordance with some embodiments of the present disclosure.

Continuous skeletons in FIG. 7A are representative of overlapping leaves. To separate the one or more skeletons of overlapping leaves from the one or more leaves into sub-skeletons, pixels having values lower than an empirically determined second threshold are eliminated, wherein each of the sub-skeletons is representative of one of the one or more leaves. In an embodiment the empirically determined second threshold is 70% of maximum pixel intensity or value in the skeleton image for grape leaves. FIG. 7B illustrates sub-skeletons obtained from the FIG. 7A, in accordance with some embodiments of the present disclosure. Seed point for an associated sub-skeleton corresponding to one of the one or more leaves is a pixel having a maximum value in each of the sub-skeletons. The maximum value lies between 0 and 255 in the skeleton image of FIG. 7B. FIG. 8 illustrates seed points selected for each leaf, in accordance with some embodiments of the present disclosure and referenced by numeral 802.

Once the seed points are selected for each leaf, the next step is to obtain the one or more full leaves. In an embodiment, the one or more processors 104 are configured to perform region growing, at step 310, using an k-neighborhood method, to obtain contours of one or more full leaves, wherein the region growing starts from the seed point selected for each of the one or more leaves. In an embodiment, k=8. In an embodiment, the step of performing region growing comprises computing gradient value of pixels of the deveined image in X and Y directions using an edge detection filter. In an embodiment the edge detection filter may be Sobel filters. Then the Laplacian is computed as a sum of squares of the computed gradient value of pixels of the binary image of the deveined image. A gradient image is obtained by computing square root of the sum of squares. This is followed by computing a gradient threshold using the computed gradient image.

In an embodiment the computing of the gradient threshold involves selecting a window of size n×n around the seed point. In an embodiment n=m (from the reconstruction of over-exposed areas steps). An N-bin histogram of the gradient value of pixels in the gradient image is calculated. In an embodiment, N=25. The gradient threshold is calculated as ((bin_number+1)*10)/255, wherein bin_number represents a bin with a highest pixel count.

Figure 9:
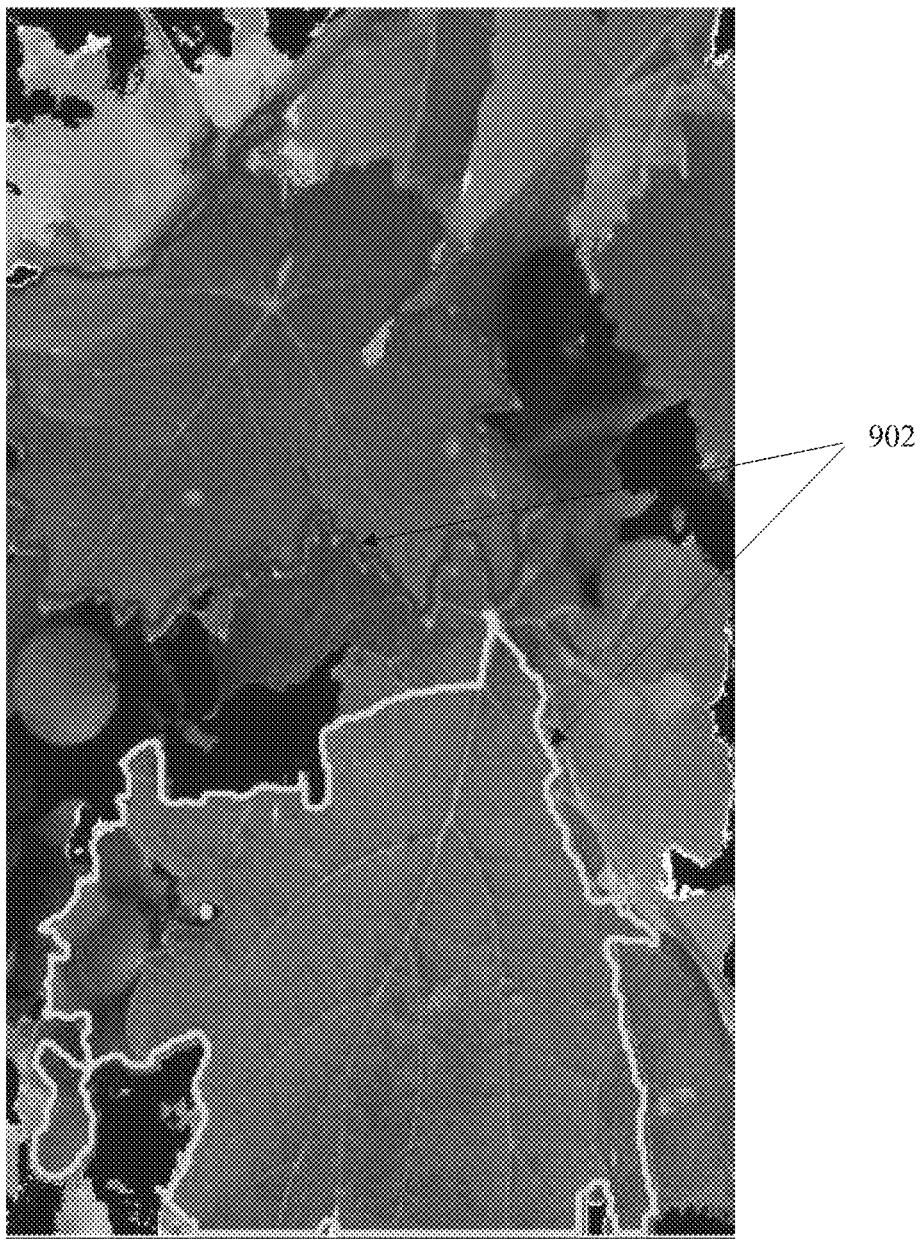
FIG. 9 illustrates full leaves obtained, in accordance with some embodiments of the present disclosure.

Having calculated the gradient threshold, the region growing is initiated by starting from the seed point and iteratively merging pixels having the computed gradient value greater than the computed gradient threshold to obtain one or more full leaves corresponding to each of the one or more seed points. The iterative merging of the pixels stops when the computed gradient threshold is less than the value of pixels in the gradient image. FIG. 9 illustrates full leaves obtained, in accordance with some embodiments of the present disclosure, wherein the reference numeral 902 represents contours of the obtained one or more full leaves.

Once the one or more full leaves are obtained, they can be used for identifying the plant species and for estimating the leaf age. Accordingly, in an embodiment of the present disclosure, the method 300 further comprises one or more of the following steps. The associated plant species may be identified, at step 312, using similarity of the leaf shapes using shape matching method-based Hu moments. Contours of full leaves as well as the Hu moments of multiple leaves of the same plant are saved in the plant database. For every plant, the leaves may not have exactly the same shape. So multiple leaves are collected and a set of Hu moments describing the shape of these leaves is saved for each plant along with associated species.

Using the obtained leaf contours, the Hu moments are calculated for each leaf. There are 7 moments that can be termed as shape descriptors for the leaf. These are a set of values calculated using central moments that are invariant to image transformations. The first 6 moments are invariant to translation, size and rotation while the 7th moment is skew invariant and its sign changes by image reflection.

Images of multiple leaves of various plants at different growth stages are saved in the plant database. Hu moments for every leaf are also calculated and saved in the database. A classification model is trained using these leaves in order to categorize the plants based on their Hu moments i.e. based on their leaf-shapes. For an input image, the class i.e. plant species is predicted. For the predicted plant species, the shape of leaves in the plant database and that of the input image are matched. Hu moments are scale and rotation invariant. Hence, the leaves of same plant at any growth stage have negligible difference in their Hu moments. So matching the input leaf image with a single leaf of a plant in the database provides reliable results.

In an embodiment, the distance I between an input leaf image (A) and the leaf in the database (B) using Hu moments is calculated as follows.

$$I_1(A, B) = \sum_{i=1...7} \left| \frac{1}{m_i^A} - \frac{1}{m_i^B} \right|$$

where $m_i^A = \text{sign}(h_i^A) \cdot \log h_i^A$, $m_i^B = \text{sign}(h_i^B) \cdot \log h_i^B$ and $h_i^A$ and $h_i^B$ are Hu moments of A and B respectively.

Based on experiments, a threshold of 1 has been set for the distance measure. The input leaf matches the shape of the classified plant category only if the distance between Hu moments of input and the leaf from database is less than the threshold=1. Hence, the leaf which satisfies the above condition is considered as a complete leaf of a known plant species. Only complete leaves are used for age estimation in order to avoid wrong outputs. If no match satisfying the above condition is found, the segment of leaf is considered as incomplete or an unknown leaf and age estimation is not done for it.

Figure 10A:
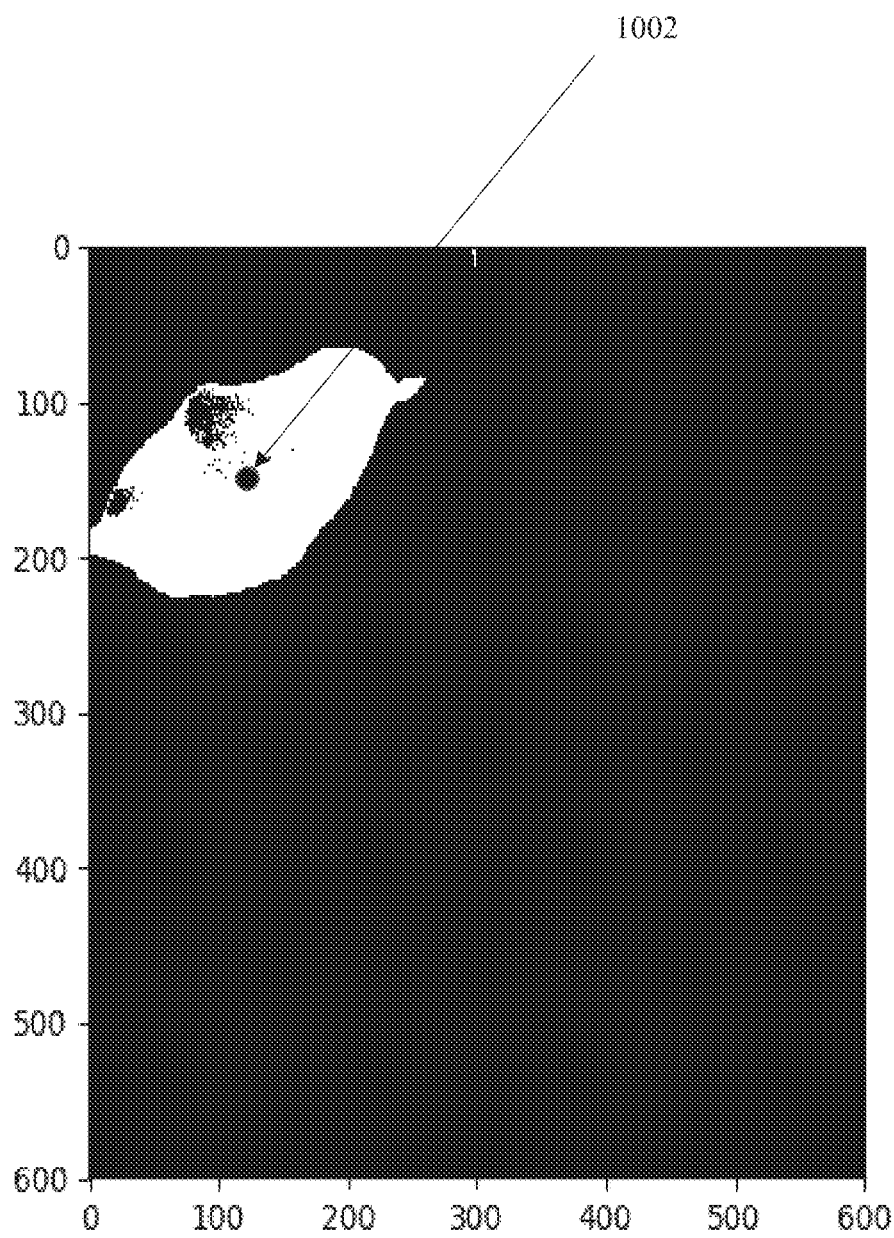
Figure 10B:
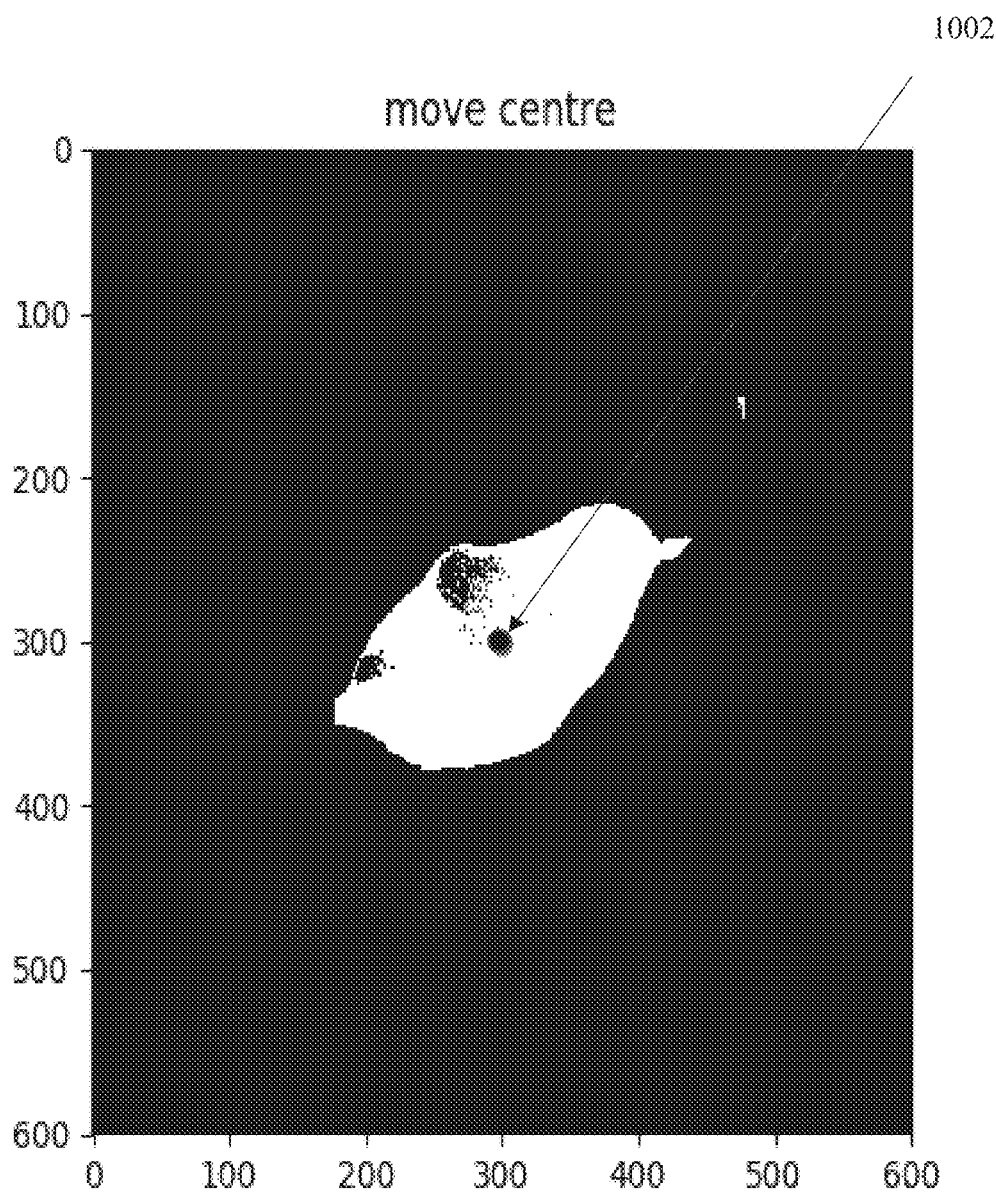
FIG. 10B illustrates the leaf of FIG. 10A shifted such that the centroid is aligned with the center of the binary image, in accordance with some embodiments of the present disclosure.

In accordance with the present disclosure, particular morphological features have been identified that facilitate leaf age estimation. The step of computing morphological features of the identified one or more leaves in accordance with the present disclosure is preceded by converting an image associated with each of the identified one or more full leaves to gray scale to obtain a binary image, wherein all the pixels having gray value >=10 are replaced with 255 while the rest are replaced with 0. The centroid of each of the one or more full leaves is shifted to the center of the binary image, wherein the centroid is computed using co-ordinates of points along the contour of each of the one or more full leaves. FIG. 10A illustrates a leaf with a centroid (reference numeral 1002) marked therein while FIG. 10B illustrates the leaf of FIG. 10A shifted such that the centroid (1002) is aligned with the center of the binary image, in accordance with some embodiments of the present disclosure.

Figure 10C:
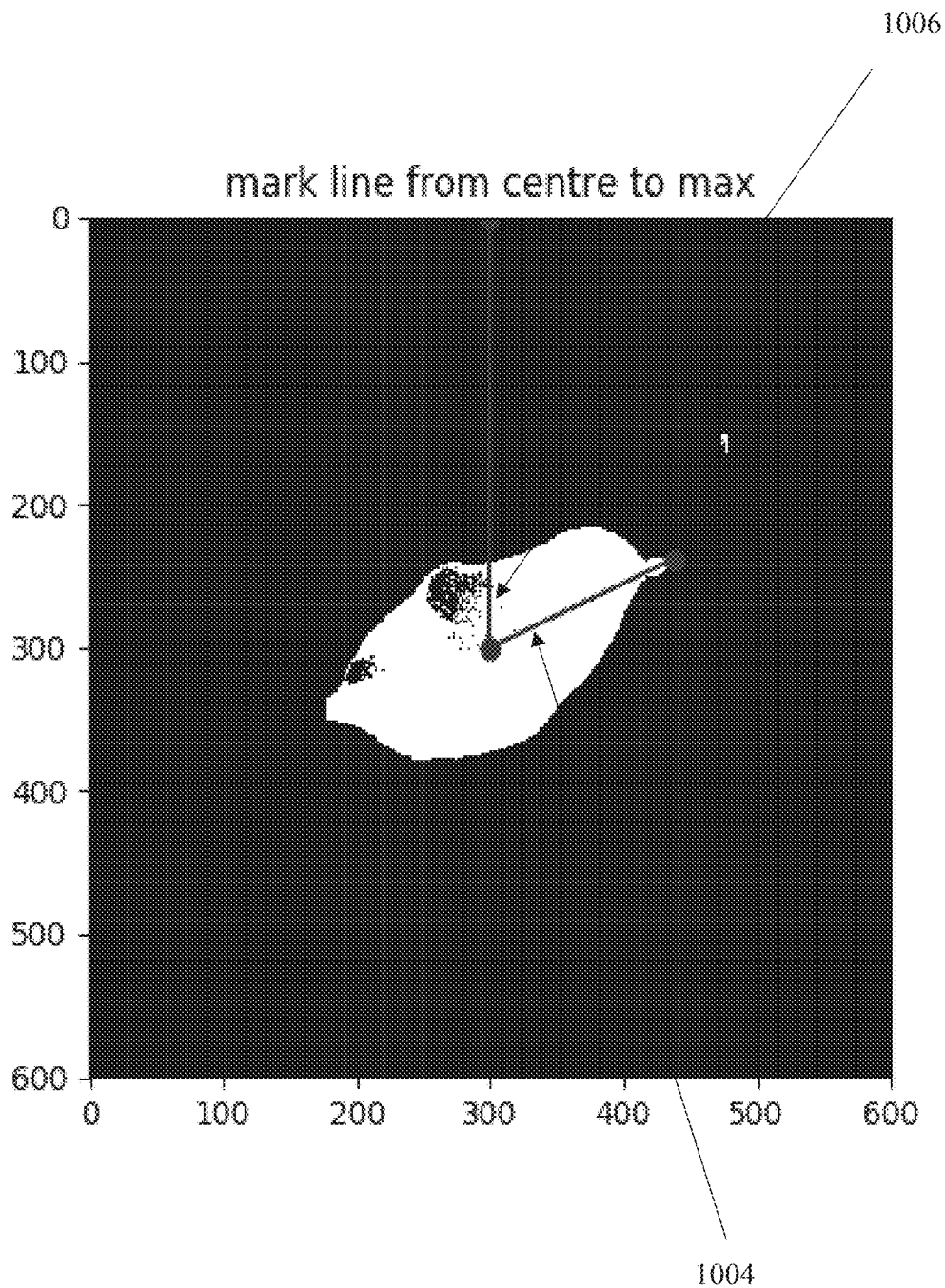
FIG. 10C and FIG. 10D illustrate rotation of the leaf of FIG. 10B such that a line joining the center of the image with a farthest point on the contour of the one or more full leaves passes through the center of the image along the vertical axis, in accordance with some embodiments of the present disclosure.
Figure 10D:
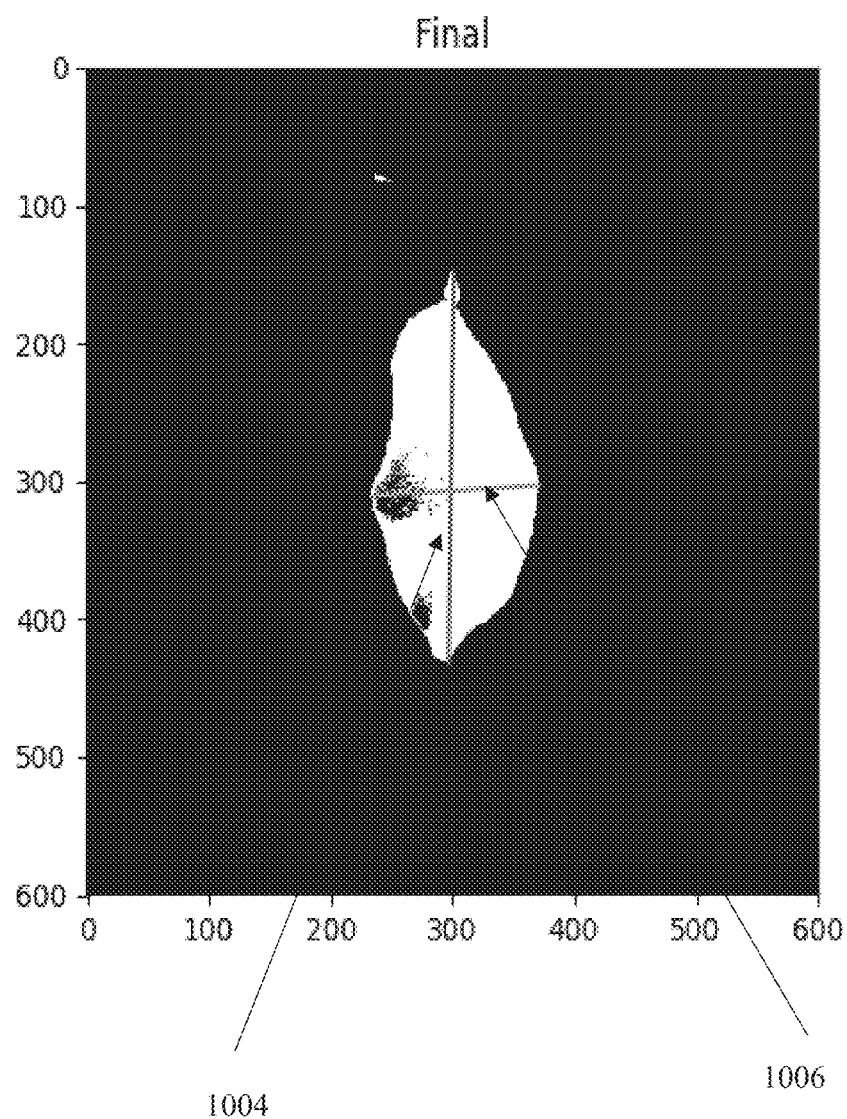

Each of the one or more full leaves are rotated such that a line joining the center of the image with a farthest point on the contour (reference numeral 1004) of the one or more full leaves passes through the center of the image along the vertical axis (reference numeral 1006). FIG. 10C and FIG. 10D illustrate rotation of the leaf of FIG. 10B.

The rotation of each of the one or more full leaves is performed by determining the farthest point on the contour of the one or more full leaves that is at a maximum distance from the associated centroid. An angle between (i) a line joining the center of the image to the determined farthest point and (ii) a line passing through the center of the image along the vertical axis is computed. Subsequently, each of the one or more full leaves are rotated based on a rotation matrix defined using the computed angle. The morphological features relevant to estimation of the leaf age are then computed.

In an embodiment, the one or more hardware processors 104 are configured to compute, at step 314, morphological features of the obtained one or more full leaves including i) ratio of leaf length to width of leaf calculated at the center of the leaf (ii) ratio of leaf length to the maximum width of the leaf (iii) ratio of bounding box area around leaf to the area of leaf (iv) color of leaf in terms of 'a' and 'b' components on CieLab format.

Figure 11A:
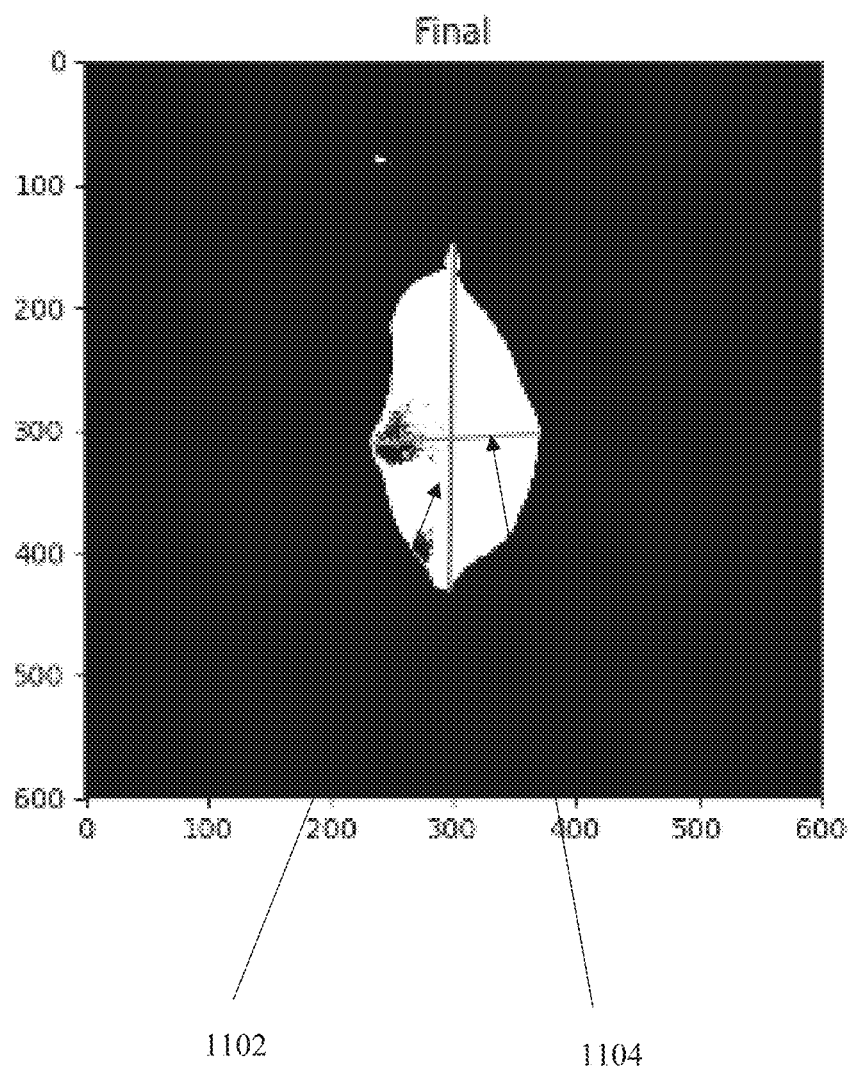
FIG. 11A illustrates length and maximum width of a leaf, in accordance with some embodiments of the present disclosure.

FIG. 11A illustrates length and maximum width of a leaf, in accordance with some embodiments of the present disclosure. Some leaves are tapering and might have maximum width at the bottom instead of center e.g. a paddy leaf. The contour of the leaf obtained earlier is divided into two sets (i) the points with column (x-axis) value on left side of the centroid (ii) points with column value (x-axis) value on right side of the centroid. Corresponding contour point in both sets that have same row (y-axis) value i.e. horizontally aligned are considered and distance between them is computed. The maximum value of distance is considered as the maximum width of the leaf (reference numeral 1104 in FIG. 11A). The length of the leaf is represented by reference numeral 1102 in FIG. 11A.

Figure 11B:
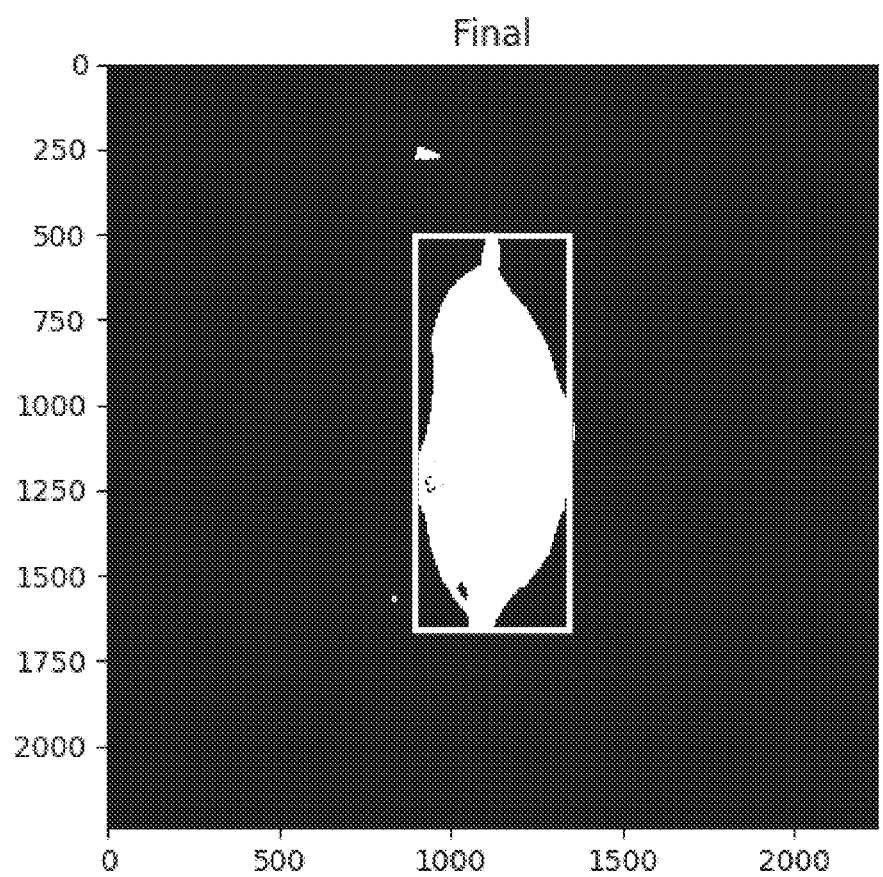
FIG. 11B illustrates a bounding box around a leaf, in accordance with some embodiments of the present disclosure, determined using the length and maximum width of the leaf illustrated in in FIG. 11A.

In accordance with an embodiment of the present disclosure, dilation is applied to the binary image of the leaf to fill up pixel gaps in between group of pixels representing the leaf. Then the area of the leaf is calculated such that leaf area=number of pixels corresponding to the leaf (i.e. number of white pixels in a diluted binary image) FIG. 11B illustrates a bounding box around a leaf, in accordance with some embodiments of the present disclosure, determined using the length and maximum width of the leaf illustrated in in FIG. 11A. The bounding box tightly encapsulates the leaf inside it. Then, the ratio of bounding box area around the leaf to the actual area of the leaf is calculated as a feature relevant for leaf age estimation.

Leaf color also changes as a plant grows. In some plants, the color changes the hue altogether while in some the shade of color changes e.g. light to dark as leaf ages. Hence the 'a' and 'b' components of the color of the leaf on CieLab format are used as one of the features for age estimation. CieLab format averts the effect of difference in luminosity due to different light conditions.

In accordance with an embodiment of the present disclosure, the one or more hardware processors 104 are configured to receive, at step 316, an additional morphological feature in the form of growth stage of the plant associated with the one or more leaves being monitored. Examples of growth stage include vegetation, reproductive, ripening, and the like.

In accordance with an embodiment of the present disclosure, the one or more hardware processors 104 are configured to estimate an age of every leaf from the identified one or more full leaves, at step 318, using a pre-trained multivariable linear regression model receiving one or more of the computed and received morphological features, wherein the multivariable linear regression model is pre-trained using the identified plant species, associated leaf shapes, morphological features of leaves of the identified plant species and age thereof. By estimating the age of a leaf age based on its phenology and visual parameters (morphological features), the growth rate of the leaf may be studied. For instance, if visual age of a leaf is less than the actual age in number of days, it implies that the growth rate of the plant is lower than ideal.

In an embodiment, the multivariable linear regression model may be defined as $Y(x_1, x_2, \ldots, x_n) = w_0, w_1 x_1, w_2 x_2, \ldots + w_n, x_n$, where $w_n$ represents weight/coefficient and $x_n$ are the features/attributes. The multivariable linear regression model is pretrained using Mean Squared Error (MSE) loss for different leaf shapes using the collected data and Y is the age of the leaf in days. The coefficients are different for different plan varieties due to difference in shapes and hence the computed morphological features described above are pertinent in estimating the leaf age.

In an embodiment, the multivariable linear regression model may be pretrained with similar shaped leaves rather than with leaves of the exact same species. For instance, lemon and oranges have similar leaves though they do not belong to the same species. Some varieties of chillies and *capsicum* may have similar leaves. Alternatively, the multivariable linear regression model may be pretrained for a specific variety of *capsicum*.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:
   receiving, via one or more hardware processors, an image including one or more leaves that need to be monitored;
   segmenting, via the one or more hardware processors, the received image to identify veins in the one or more leaves, wherein identifying veins comprises:
      performing edge detection on the received image to obtain edges representative of veins and contours of the one or more leaves;
      determining straight lines from the obtained edges; and
      identifying the determined straight lines as veins if a difference between average pixel intensity on either side of the straight lines is lesser than an empirically determined first threshold;
   obtaining, via the one or more hardware processors, a de-veined image by replacing each pixel on the identified veins with an average pixel intensity of neighboring pixels;
   selecting, via the one or more hardware processors, a seed point for each of the one or more leaves using distance transform on a binary image of the de-veined image; and
   performing region growing, via the one or more hardware processors, using an k-neighborhood method, to obtain contours of one or more full leaves, wherein the region growing starts from the seed point selected for each of the one or more leaves.

2. The processor implemented method of claim 1, wherein the step of segmenting is preceded by pre-processing the received image by performing one or more of brightness correction, light reflection removal and background removal.

3. The processor implemented method of claim 2, wherein the step of light reflection removal comprises:
   identifying pixels with luminance value greater than 80, from a Hue-Saturation-Luminance (HSL) format of the received image as overexposed pixels;
   selecting an m×m window, for each of the identified overexposed pixels, with each of the identified overexposed pixel being the centroid of an associated window; and
   replacing each of the identified overexposed pixels with neighboring pixels having a minimum hue difference with the identified overexposed pixels.

4. The processor implemented method of claim 1, wherein the step of selecting a seed point for each of the one or more leaves comprises:
   converting the deveined image to the binary image such that a white region therein forms a foreground which is representative of the one or more leaves while the other areas in the image being black form a background of the image;
   applying a distance transform on the binary image to replace value of each pixel in the binary image by an associated distance to a nearest background pixel;
   identifying one or more regions within the distance transformed image as one or more skeletons, using thinning, wherein the one or more skeletons are characterized by pixels having a maximum value corresponding to a farthest region from a boundary of the white region;
   separating the one or more skeletons of overlapping leaves from the one or more leaves into sub-skeletons by eliminating pixels having values lower than an empirically determined second threshold, wherein each of the sub-skeletons is representative of one of the one or more leaves; and
   selecting a pixel having a maximum value in each of the sub-skeletons as the seed point for an associated sub-skeleton corresponding to one of the one or more leaves.

5. The processor implemented method of claim 4, wherein the step of applying a distance transform is preceded by applying erosion and dilation on the binary image to remove noise pixels.

6. The processor implemented method of claim 1, wherein the step of performing region growing comprises:
  computing gradient value of pixels of the deveined image in X and Y directions using an edge detection filter;
  computing a sum of squares of the computed gradient value of pixels of the binary image of the deveined image;
  computing square root of the sum of squares to obtain a gradient image;
  computing a gradient threshold using the computed gradient image by:
    selecting a window of size n×n around the seed point;
    computing an N-bin histogram of the gradient value of pixels in the gradient image; and
    calculating the gradient threshold as ((bin_number+1)*10)/255, wherein bin_number represents a bin with a highest pixel count; and
  initiating region growing by starting from the seed point and iteratively merging pixels having the computed gradient value greater than the computed gradient threshold to obtain one or more full leaves corresponding to each of the one or more seed points, wherein the iterative merging of the pixels stop when the computed gradient threshold is less than the value of pixels in the gradient image.

7. The processor implemented method of claim 1 further comprising one or more of:
  identifying, via the one or more hardware processors, an associated plant species based on the obtained one or more full leaves and similarity of leaf shapes using shape matching method-based Hu moments;
  computing, via the one or more hardware processors, morphological features of the obtained one or more full leaves including i) ratio of leaf length to width of leaf calculated at the center of the leaf (ii) ratio of leaf length to the maximum width of the leaf (iii) ratio of bounding box area around a leaf to the area of the leaf (iv) color of a leaf in terms of 'a' and 'b' components on CieLab format;
  receiving, via the one or more hardware processors, an additional morphological feature in the form of growth stage of the plant associated with the one or more leaves being monitored; and
  estimating, via the one or more hardware processors, an age of every leaf from the identified one or more full leaves using a pre-trained multivariable linear regression model receiving one or more of the computed and received morphological features, wherein the multivariable linear regression model is pre-trained using the identified plant species, associated leaf shapes, morphological features of leaves of the identified plant species and age thereof.

8. The processor implemented method of claim 7, wherein the step of computing morphological features of the identified one or more leaves is preceded by:
  converting an image associated with each of the identified one or more full leaves to gray scale to obtain a binary image;
  shifting the centroid of each of the one or more full leaves to the center of the binary image, wherein the centroid is computed using co-ordinates of points along the contour of each of the one or more full leaves; and
  rotating each of the one or more full leaves such that a line joining the center of the image with a farthest point on the contour of the one or more full leaves passes through the center of the image along the vertical axis by:
    determining the farthest point on the contour of the one or more full leaves that is at a maximum distance from the associated centroid;
    computing an angle between (i) a line joining the center of the image to the determined farthest point and (ii) a line passing through the center of the image along the vertical axis; and
    rotating each of the one or more full leaves based on a rotation matrix defined using the computed angle.

9. A system comprising:
  one or more data storage devices operatively coupled to one or more hardware processors via the one or more input/output interfaces; and configured to store instructions configured for execution via the one or more hardware processors to:
    receive an image including one or more leaves that need to be monitored;
    segment, the received image to identify veins in the one or more leaves, wherein identifying veins comprises:
      performing edge detection on the received image to obtain edges representative of veins and contours of the one or more leaves;
      determining straight lines from the obtained edges; and
      identifying the determined straight lines as veins if a difference between average pixel intensity on either side of the straight lines is lesser than an empirically determined first threshold;
    obtain a de-veined image by replacing each pixel on the identified veins with an average pixel intensity of neighboring pixels;
    select a seed point for each of the one or more leaves using distance transform on a binary image of the de-veined image; and
    perform region growing using a k-neighborhood method, to obtain contours of one or more full leaves, wherein the region growing starts from the seed point selected for each of the one or more leaves.

10. The system of claim 9, wherein the one or more processors are further configured to pre-process the received image by performing one or more of brightness correction, light reflection removal and background removal.

11. The system of claim 10, wherein the one or more processors are configured to perform light reflection removal by:
  identifying pixels with luminance value greater than 80, from a Hue-Saturation-Luminance (HSL) format of the received image as overexposed pixels;
  selecting an m×m window, for each of the identified overexposed pixels, with each of the identified overexposed pixel being the centroid of an associated window; and
  replacing each of the identified overexposed pixels with neighboring pixels having a minimum hue difference with the identified overexposed pixels.

12. The system of claim 9, wherein the one or more processors are configured to perform selecting a seed point for each of the one or more leaves by:
  converting the deveined image to the binary image such that a white region therein forms a foreground which is representative of the one or more leaves while the other areas in the image being black form a background of the image;
  applying a distance transform on the binary image to replace value of each pixel in the binary image by an associated distance to a nearest background pixel;

identifying one or more regions within the distance transformed image as one or more skeletons, using thinning, wherein the one or more skeletons are characterized by pixels having a maximum value corresponding to a farthest region from a boundary of the white region;

separating the one or more skeletons of overlapping leaves from the one or more leaves into sub-skeletons by eliminating pixels having values lower than an empirically determined second threshold, wherein each of the sub-skeletons is representative of one of the one or more leaves; and selecting a pixel having a maximum value in each of the sub-skeletons as the seed point for an associated sub-skeleton corresponding to one of the one or more leaves.

13. The system of claim 12, wherein the one or more processors are further configured to apply erosion and dilation on the binary image to remove noise pixels prior to applying the distance transform.

14. The system of claim 9, wherein the one or more processors are configured to perform region growing by:
   computing gradient value of pixels of the deveined image in X and Y directions using an edge detection filter;
   computing a sum of squares of the computed gradient value of pixels of the binary image of the deveined image;
   computing square root of the sum of squares to obtain a gradient image;
   computing a gradient threshold using the computed gradient image by:
      selecting a window of size n×n around the seed point;
      computing an N-bin histogram of the gradient value of pixels in the gradient image; and
      calculating the gradient threshold as ((bin_number+1) *10)/255, wherein bin_number represents a bin with a highest pixel count; and
   initiating region growing by starting from the seed point and iteratively merging pixels having the computed gradient value greater than the computed gradient threshold to obtain one or more full leaves corresponding to each of the one or more seed points, wherein the iterative merging of the pixels stop when the computed gradient threshold is less than the value of pixels in the gradient image.

15. The system of claim 9, wherein the one or more processors are further configured to perform one or more of:
   identifying an associated plant species based on the obtained one or more full leaves and similarity of leaf shapes using shape matching method-based Hu moments;
   computing morphological features of the obtained one or more full leaves including i) ratio of leaf length to width of leaf calculated at the center of the leaf (ii) ratio of leaf length to the maximum width of the leaf (iii) ratio of bounding box area around a leaf to the area of the leaf (iv) color of a leaf in terms of 'a' and 'b' components on CieLab format;
   receiving an additional morphological feature in the form of growth stage of the plant associated with the one or more leaves being monitored; and
   estimating an age of every leaf from the identified one or more full leaves using a pre-trained multivariable linear regression model receiving one or more of the computed and received morphological features, wherein the multivariable linear regression model is pre-trained using the identified plant species, associated leaf shapes, morphological features of leaves of the identified plant species and age thereof.

16. The system of claim 15, wherein the one or more processors are further configured to perform, prior to computing the morphological features, the steps of:
   converting an image associated with each of the identified one or more full leaves to gray scale to obtain a binary image;
   shifting the centroid of each of the one or more full leaves to the center of the binary image, wherein the centroid is computed using co-ordinates of points along the contour of each of the one or more full leaves; and
   rotating each of the one or more full leaves such that a line joining the center of the image with a farthest point on the contour of the one or more full leaves passes through the center of the image along the vertical axis by:
      determining the farthest point on the contour of the one or more full leaves that is at a maximum distance from the associated centroid;
      computing an angle between (i) a line joining the center of the image to the determined farthest point and (ii) a line passing through the center of the image along the vertical axis; and
      rotating each of the one or more full leaves based on a rotation matrix defined using the computed angle.

17. A computer program product comprising a non-transitory computer readable medium having a computer readable program embodied therein, wherein the computer readable program, when executed on a computing device, causes the computing device to:
   receive an image including one or more leaves that need to be monitored;
   segment, the received image to identify veins in the one or more leaves, wherein identifying veins comprises:
      performing edge detection on the received image to obtain edges representative of veins and contours of the one or more leaves;
      determining straight lines from the obtained edges; and
      identifying the determined straight lines as veins if a difference between average pixel intensity on either side of the straight lines is lesser than an empirically determined first threshold;
   obtain a de-veined image by replacing each pixel on the identified veins with an average pixel intensity of neighboring pixels;
   select a seed point for each of the one or more leaves using distance transform on a binary image of the de-veined image; and
   perform region growing using a k-neighborhood method, to obtain contours of one or more full leaves, wherein the region growing starts from the seed point selected for each of the one or more leaves.

18. The computer program product of claim 17, wherein the computer readable program further causes the computing device to perform one or more of:
   identifying an associated plant species based on the obtained one or more full leaves and similarity of leaf shapes using shape matching method-based Hu moments;
   computing morphological features of the obtained one or more full leaves including i) ratio of leaf length to width of leaf calculated at the center of the leaf (ii) ratio of leaf length to the maximum width of the leaf (iii) ratio of bounding box area around a leaf to the area of the leaf (iv) color of a leaf in terms of 'a' and 'b' components on CieLab format;

receiving an additional morphological feature in the form of growth stage of the plant associated with the one or more leaves being monitored; and estimating an age of every leaf from the identified one or more full leaves using a pre-trained multivariable linear regression model receiving one or more of the computed and received morphological features, wherein the multivariable linear regression model is pre-trained using the identified plant species, associated leaf shapes, morphological features of leaves of the identified plant species and age thereof.

\* \* \* \* \*